United States Patent [19]
Kawamura et al.

[11] Patent Number: 4,799,074
[45] Date of Patent: Jan. 17, 1989

[54] CAMERA

[75] Inventors: Masaharu Kawamura; Yoshihito Harada; Ryuichi Kobayashi; Masayuki Suzuki, all of Kanagawa; Tsunemasa Ohara; Yoichi Tosaka, both of Tokyo, all of Japan

[73] Assignee: Canon Kabushiki Kaisha, Tokyo, Japan

[21] Appl. No.: 168,583

[22] Filed: Mar. 3, 1988

Related U.S. Application Data

[63] Continuation of Ser. No. 839,127, Mar. 12, 1986, abandoned.

[30] Foreign Application Priority Data

Mar. 15, 1985 [JP] Japan ................................ 60-053061

[51] Int. Cl.$^4$ ............................................. G03B 9/40
[52] U.S. Cl. .............................. 354/173.1; 354/205; 354/234.1; 354/249
[58] Field of Search ................ 354/173.1, 173.11, 205, 354/214, 249, 234.1

[56] References Cited

U.S. PATENT DOCUMENTS

| | | | |
|---|---|---|---|
| 4,540,260 | 9/1985 | Nakano | 354/173.1 |
| 4,579,435 | 4/1986 | Haraguchi | 354/173.1 |
| 4,616,913 | 10/1986 | Suzuki et al. | 354/173.1 |

Primary Examiner—Michael L. Gellner
Attorney, Agent, or Firm—Toren, McGeady & Associates

[57] ABSTRACT

A camera having a detector for detecting transition from the wind to rewind mode and a control circuit responsive to the output of the detector for controlling a shutter in such a manner that the exposure aperture of the film gate is covered by both leading and trailing blade groups of the shutter just before the initiation of a film rewinding operation.

15 Claims, 11 Drawing Sheets

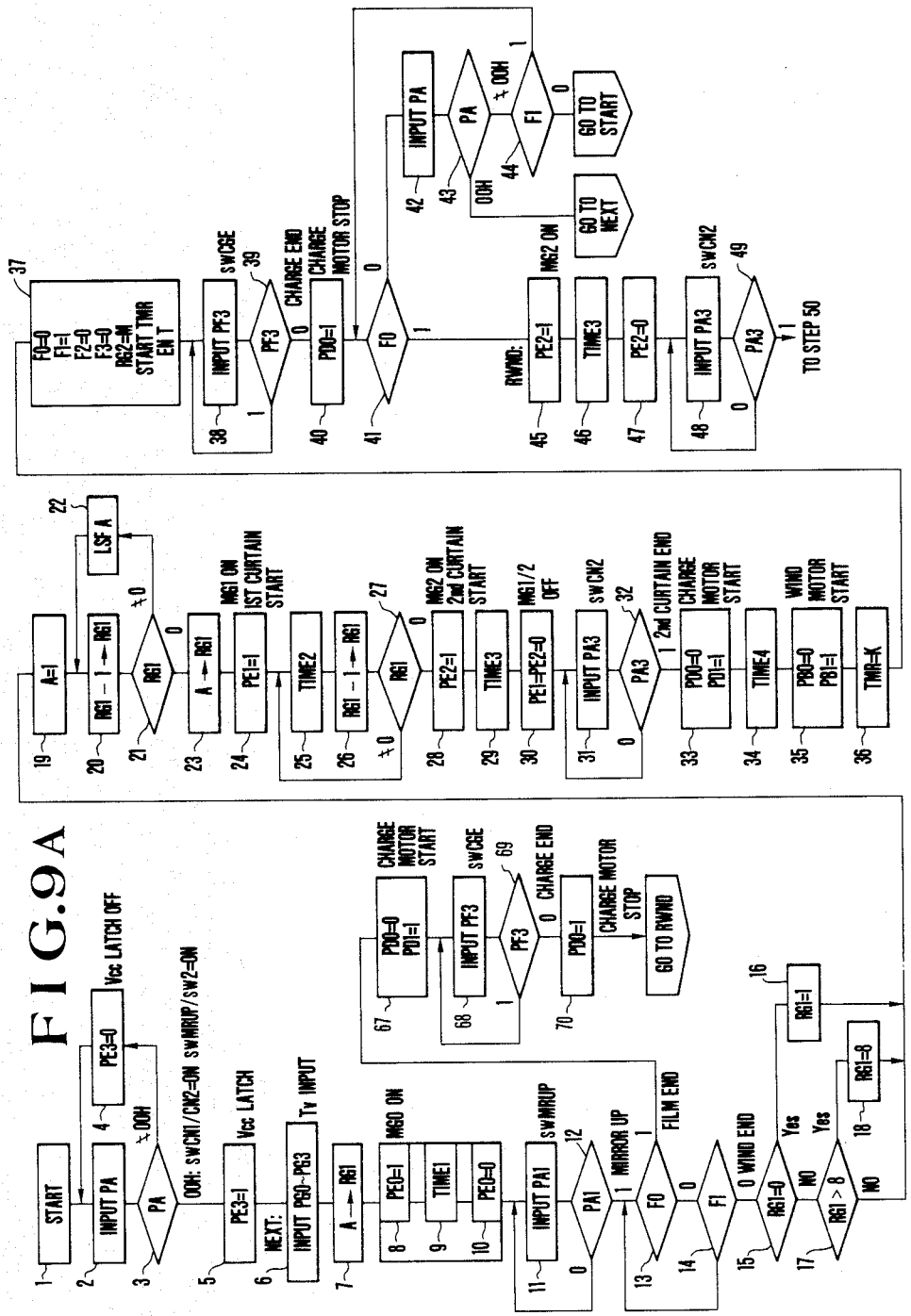

CAMERA

This is a continuation of application Ser. No. 839,127, filed Mar. 12, 1986, now abandoned.

BACKGROUND OF THE INVENTION

1. Field of the Invention

This invention relates to cameras and more particularly, to prevention of the exposed film from being fogged when it is being rewound.

2. Description of the Prior Art

Recently, the trend of increasing the maximum speed of the shutter of the single lens reflex camera has advanced to 1/4000 sec. and strobe-synchro speed of 1/250 sec. And an even faster shutter, too, comes out. In these shutters, it is required to reduce the mass of the blades. So the shutter blades are thinned to an extreme.

By the way, for the film transportation in the camera, particularly when in the rewind mode, because the film is continuously run in frictional contact with the film gate, static electricity is generated. In the case of motorized rewinding, the running film induces swirling of wind between the shutter and the film gate. Here it will be understood that as it has been customary to employ only the front blade group of the shutter for covering the exposure aperture of the film gate in the shutter-cocked position, if the rewinding is performed under such a condition, the above-mentioned static electricity or air pressure will cause the front blade group to deform with the result that when the front blade group is constructed in the form of a set of extremely thinned plates or blades, it is split in two between the successive blades, permitting light to leak into the exposure aperture. The conventional cameras has, therefore, a problem of fogging the exposed film by such leaked light when the film is being rewound. Such a problem has become very serious when the camera gets the capabilities of speeding up the shutter and motorizing the film rewinding, since the fogging will often take place over the entire area of the film.

SUMMARY OF THE INVENTION

An object of the invention is to eliminate the problem of fogging the film when it is being rewound by preventing light leakage of the shutter despite the shutter blades being deformed by the static electricity or air pressure generated by the running film.

Other objects of the invention will become apparent from the following detailed description.

BRIEF DESCRIPTION OF THE DRAWINGS

FIGS. 9A, 9B and 10 are a flowchart.

DETAILED DESCRIPTION OF THE PREFERRED EMBODIMENT

The present invention will next be described by reference to the drawings. Described in detail below is an embodiment of the invention applied to a camera in which the film winding-up, charging of the shutter, and film rewinding are carried out by respective individual electric motors. A feature of the invention in such a camera is that the trailing blade group of the shutter is released to cooperate with the leading blade group for protecting the film against fogging when it is being rewound, as the static electricity or air pressure exerted by the high speed running of the film has a large effect on light leakage to the film at the time of rewinding, as will be seen in the sequence of steps 45 to 47 of the flowchart of this embodiment.

Figure 1:
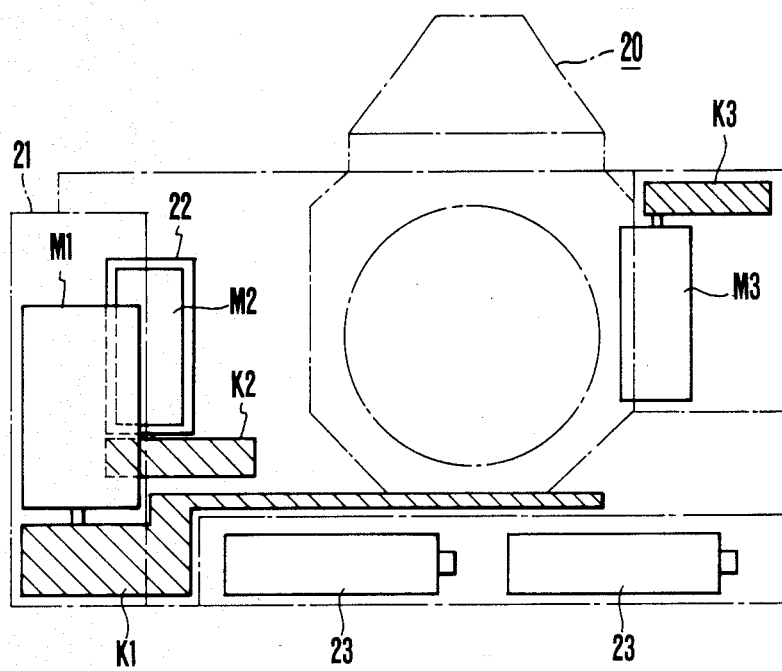
FIG. 1 is a front elevational view of an embodiment of a camera according to the present invention.

In FIG. 1, there is shown an arrangement of all electric motors as viewed from the front of the camera employing the embodiment of the invention. M1 is a charge motor for charging the shutter, a diaphragm control mechanism, focusing mechanism, and mirror drive mechanism, positioned to the left hand front corner of the camera housing 20. As far as the charge motor M1 is concerned, though variation of its load due to the ambient conditions is little, it has a large absolute load. Hence, it is necessarily of a relatively large size. On this account, it takes its place within a grip 21 protruding from the camera housing 20 at the left hand front corner. The charge motor M1 is associated with a driving torque transmission K1. Another, or wind-up, motor M2 is positioned within a spool structure 22 and has a driving torque transmission K2. Still another, or rewind, motor M3 is positioned adjacent a film cartridge chamber in the right hand front corner of the camera housing 20, and has a driving torque transmission K3. An electrical power source 23 is comprised of four cylindrical batteries.

Figure 2:
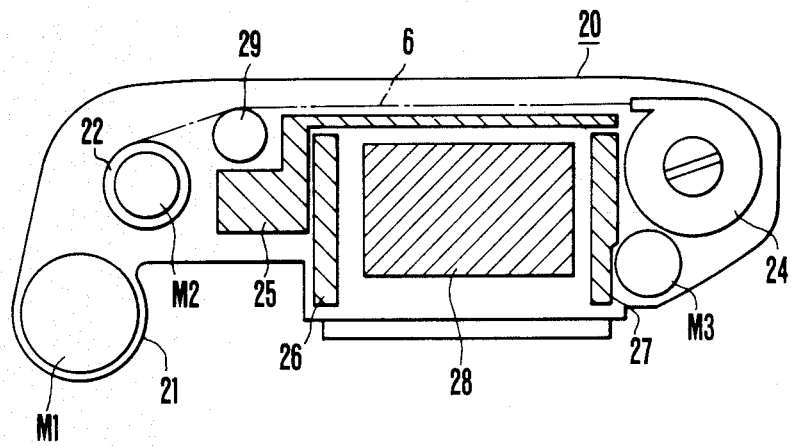
FIG. 2 is a top plan view of the same camera.

FIG. 2 shows another view of the arrangement of the above-described motors M1 to M3 as viewed from the above the camera housing 20, along with a film cartridge 24, a vertically operating shutter of the blade type 25, a mirror mechanism 26, a control mechanism 27 for a diaphragm in an objective lens, a drive mechanism 28 for the diaphragm, and a sprocket 29 for advancing film 6 one frame by one frame.

Figure 3A:
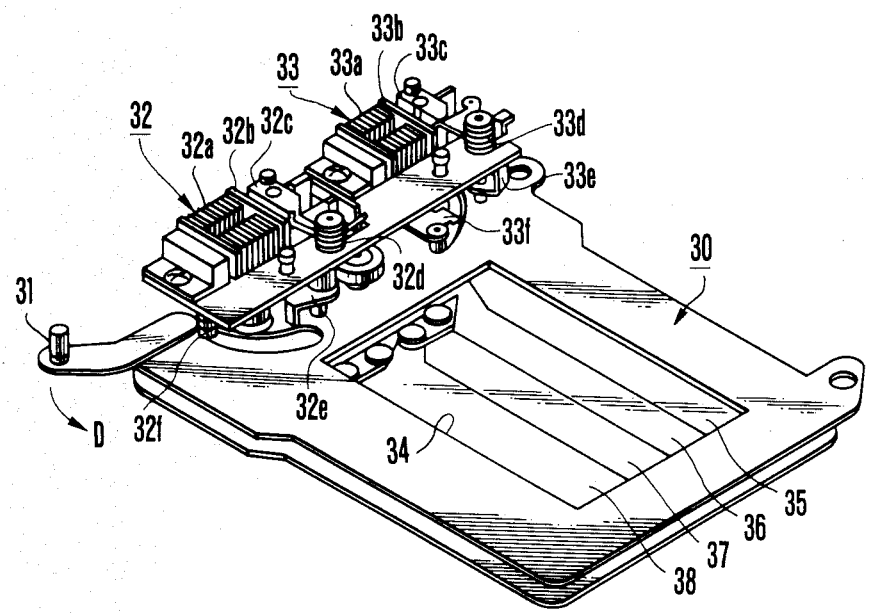
FIG. 3 illustrates a shutter device with FIG. 3A being a perspective view looked from the front, and FIG. 3B being back elevational views.
Figure 3B:
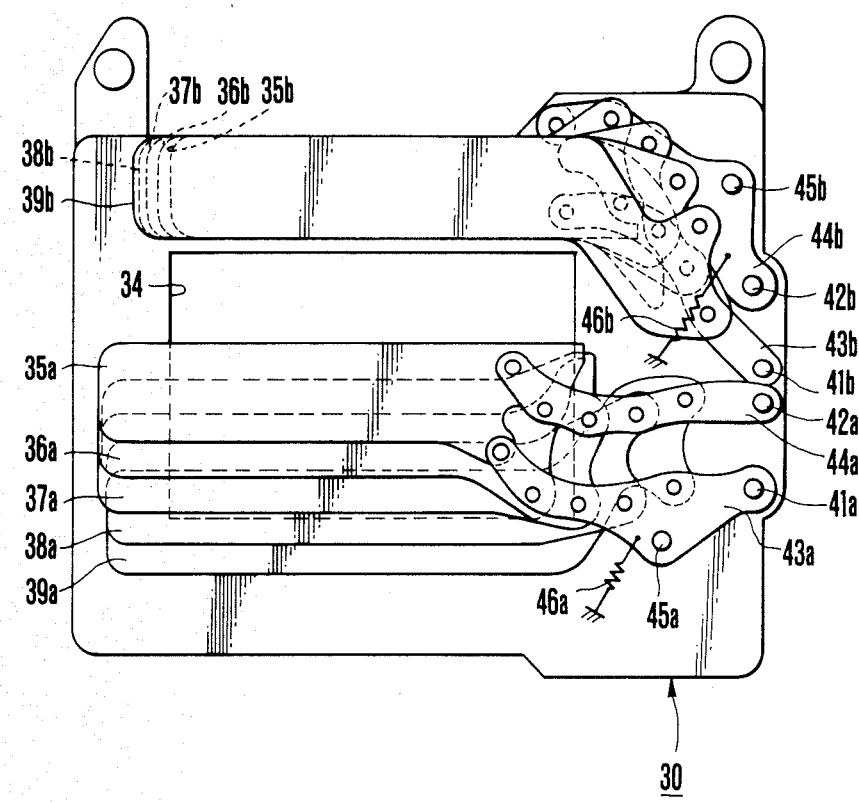

FIGS. 3A and 3B illustrate the details of the shutter 25 of FIG. 2 as a shutter unit 30. The shutter unit 30 comprises a charge lever 31 operatively connected to the transmission K1 and arranged, upon charging, to move in a direction of arrow D, and solenoids 32a and 33a for controlling the starts of running down of the leading and trailing blade groups, respectively, wrapped around yokes 32b and 33b and assembled with respective permanent magment pieces (not shown) so that when the solenoid 32a or 33a is unenergized, the yoke 32b or 33b holds an armature 33c or 33c in contact therewith by attraction, and conversely when energized, the magnetic flux of the permanent megnet piece is cancelled to release the armature 32c or 33c from the attracted locking position in contact with the yoke 32b or 33b. The armatures 32c, 33c are then respectively turned in a clockwise direction (as viewed in FIG. 3A) by bias springs 32d, 33d, while turning latch levers 32e, 33e in the clockwise direction (in FIG. 3A), thereby a blade drive levers 32f, 33f are released from being held. The drive levers 32f, 33f are then turned by power spring in a clockwise direction (in FIG. 3A), causing shutter blades 35 to 39 to run down. The shutter blades 35 to 39 comprise a group of blades 35a to 39a constituting the leading blade groups, and another group of blades 35b to 39b constituting the trailing blade group. The blade 35a in the leading blade groups and the blade 39b in the trailng blade group forms an exposure slit, while the other blade 36a to 39a in the leading blade group and 35b to 38b in the trailing blade group serve as the auxiliary blades. The group of blades 35a to 39a are supported so as to move in parallel linkage by a pair of operating arms 43a and 44a pivotal about respective pins 41a and 42a. The group of blades 35b to 39b are also supported so as to move in parallel linkage by a pair of operating arms 43b and 44b pivotal about respective pins 41b and 42b. And, the operating arm 43a for the leading blade group is connected by a pin 45a to the drive lever 32f, and the operating arm 44b for the trailng blade group is connected by a pin 45b to the drive lever 33f, so that when the drive lever 32f, 33f turns in the clockwise direction (in FIG. 3A) under the action of a drive spring 46a, 46b, each blade group 35a–39a, 35b–39b move downward in parallel. It should be noted that the current supply to each of the solenoids 32a and 33a is controlled by a circuit shown in FIG. 7 in such a manner that the initiations of operation of the leading and trailing blade groups 35a–39a and 35b–39b from the charged position are displaced by an exposure time to obtain a corresponding shutter opening to the exposure time. An apertured portion 34 is covered by only the shutter leading blade groups 35a to 39a when in the charged position. From this state, when the magnet unit 32 for the leading blade group is actuated, the blades 35a to 39a run downward to open the apertured portion 34. After that, in a particular shutter time, the magnet unit 33 for the trailing blade group is actuated and the blades 35b to 39b run downward to close the apertured portion 34. This shutter operation takes place in the normal or wind-up mode. With the leading blade group 35a to 39a covering the apertured portion 34 in the shutter-charged position, on the other hand, when the solenoid 33a for the trailing curtain is energized, the blades 35b to 39b run downward so that the apertured portion 34 is covered not only by the leading blade group 35a to 39a but also by the trailing blade group 35b to 39b. It is, therefore, at this time of double blade group light shuttering, that even if a split appears between the blades in either one of the groups 35a to 39a or 35b to 39b, light leakage to the apertured portion 34 can surely be prevented.

It should be noted that FIG. 3B illustrates different operative positions of the leading blade group 35a to 39a of the shutter as they run downward from the shutter-charged position.

Figure 4:
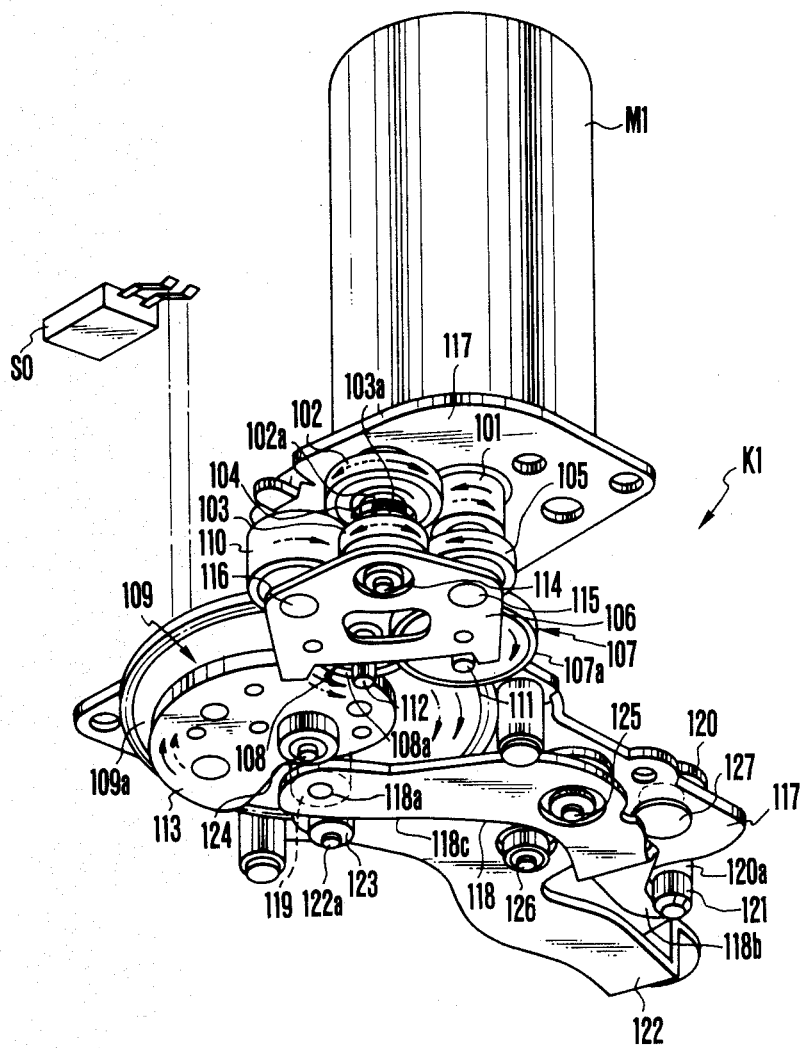
FIG. 4 is a perspective view of a charge transmission system.

In FIG. 4 there is shown the torque transmission K1 of the charge motor M1 in detail. A pinion gear 101 on the output shaft of the motor M1 meshes with a gear 102 whic constitutes a 2-stage gear together with another gear 103. The gears 102 and 103 are independently rotatably mounted on a shaft 114 fixedly mounted to a base plate 117, and have thrust projections 102a and 103a on the confronting faces thereof so that when rotated, they are unified, but when in axial directions, they are movable relative to each other. The opposite face of the gear 103 is frictionally pressed against a planetary lever 106 by a compressed spring 104 between the gears 102 and 103 so that the planetary lever 106 turns to follow up the rotation of the gear 103. A gear 105 is rotatably mounted on a pin 115 fixed in the planetary lever 106 and meshes with the gear 103. Another 2-stage gear 107 has a large gear 107a and a small gear (not shown) fixedly mounted thereon and is rotatably mounted on a pin 111 fixed in the base plate 117. When the gear 103 rotates in a clockwise direction, and the gear 105 in a counterclockwise direction (indicated by arrow), the planetary lever 106 is turned in the clockwise direction, thereby bringing the large gear 107a into meshing engagement with the gear 105. A gear 108 is rotatably mounted on a pin 112 fixed in the base plate 117, and comprises a large gear 108a and a small gear (not shown) formed on the upper surface of the gear 108a in fixed relation. The large gear 108a is always meshing with the small gear 107b. A gear 110 is rotatably mounted on a pin 116 fixed in the planetary lever 106 and is always meshing with the gear 103. When the gear 103 rotates in the counterclockwise direction, the planetary lever 106 is turned in the clockwise direction, thereby bringing the gear 110 into meshing engagement with the large gear 108a. A cam gear 109 is rotatably mounted on a pin 124 fixed in the base plate 117 and has a gear 109a and a cam disc 113. The gear 109a is always meshing with the small gear of the gear 108. Depending on the direction of rotation of the motor M1, the above-described transmission is changed over between high and low speed reductions, of which the former is selected when the motor M1 rotates in the counterclockwise direction so that as all the parts rotate in the respective directions indicated by solid line arrows and the planetary level 106 turns in the clockwise direction, a gear train of the pinion 101→the gears 102 and 103→the gear 105→the gear 107 (large gear 107a and small gear 107b)→gear 108 (the large gear 108a and the small gear 108b)→the cam gear 109 is established, the speed of rotation of the cam gear 109 being slow. Conversely, when the motor M1 rotates in the clockwise direction, as all the parts rotate in the directions indicated by dashed line arrows and the planetary lever 106 turns in the counterclockwise direction, another train of gears 101→102, 103→110→108→109 is established, and the cam gear 109 rotates at a high speed. It should be noted that the aforesaid two gear trains are so arranged that the direction of rotation of the cam gear 109 is clockwise no matter which direction the rotation of the motor M1 may take.

A first shutter charging lever 118 is pivotally mounted on a pin 125 fixed in the base plate 117 and has a roller 119 rotatable about a pin 118 fixedly mounted on one arm end thereof, the other arm of which is formed to a cam 118b. The roller 119 rides on the outer periphery or camming surface of the cam disc 113, so that as the camming surface goes up and down, swinging movement is imparted into the first shutter charging lever 118. And, such movement causes the cam 118 also to swing. A second shutter charging lever 120 is pivotally mounted on a pin 127 planted to the base plate 117 and has a roller 121 rotatable about a pin 120a fixedly mounted thereon. The roller 121 is in contact with the cam 118 to transmit movement of the first lever 118 to the second lever 120. And, the second shutter charging lever 120 charges the charge lever 31 of the shutter unit 30 shown in FIG. 3A, in the direction of arrow D.

A lever 122 for charging the known diaphragm control mechanism, mirror mechanism and focusing mechanism is pivotally mounted on a pin 126 fixed in the base plate 117, and has a roller 123 rotatable about a pin 122a fixedly mounted on one arm thereof. This roller 123 is in contact with a second cam 118c of the first shutter charging lever 118. Therefore, the lever 122 turns to follow up the lever 118, thereby charging the diaphragm control mechanism and mirror mechanism.

A switch S0 cooperates with a signal disc fixedly carried on the opposite surface of the cam gear 109 to that having the cam disc 113 to produce an output signal representing when motion of the charge motor M1 arrives at the cam 113.

Figure 5:
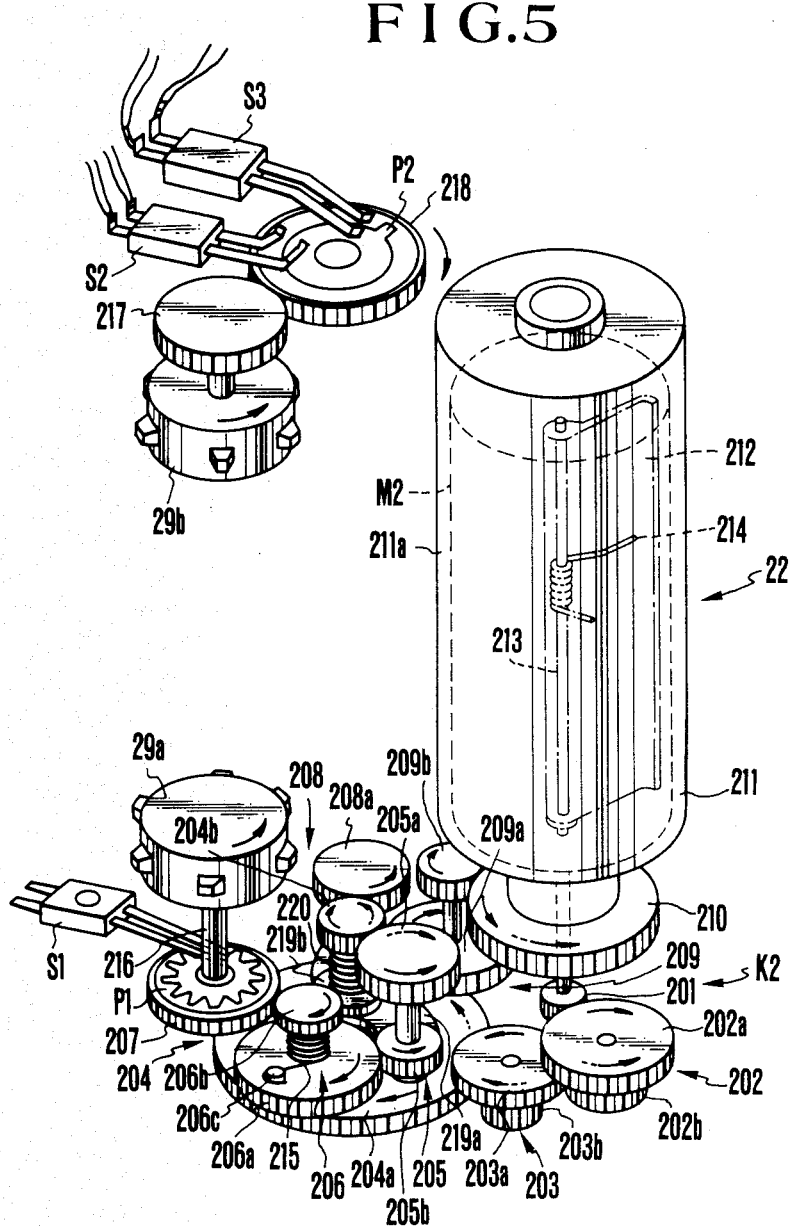
FIG. 5 is a perspective view of a wind-up transmission system.

In FIG. 5, the torque transmission K2 of the windup motor M2 is shown in detail. A pinion 201 on the output shaft of the motor M2 meshes with a 2-stage gear 202 at a large one thereof. Another 2-stage gear 203 meshes with the first one in between the large and small gears 203a and 202b. A third 2-stage gear 204 meshes with the second one in between the large and small gears 204a and 203b. On a shaft between the large and small gears 204a and 204b is pivotally mounted a planetary lever 219a through a bearing 219b. A compression spring 220 between the small gear 204b and the bearing 219b urges the latter in frictional contact on the large gear 204a. This frictional contact causes the planetary lever 219a to turn in either direction depending on the direction of rotation of the gear 204. The planetary lever 219a has two arms on which fourth and fifth 2-stage gears 205 and 208 are rotatably mounted. Positioned adjacent the fourth 2-stage gear 205 is a sixth 2-stage gear 206 whose large and small gears 206a and 206b are rotatable relative to each other but imparted with a one-way clutching function by a coil spring 215 therebetween. Since one end of the coil spring 215 is fixedly secured to a boss 206 on the upper surface of the large gear 206a, as it rotates in a clockwise direction, the coil spring 215 and the coaxial portion of the small gear 206b are constrained to rotate in unison. A gear 207 always meshes with the small gear 206b and is drivingly connected to a sprocket 29a through a shaft 216. A pulse forming disc P1, whose entire circumference is divided into 12 equal parts, is fixedly mounted on the upper surface of the gear 207 and cooperates with a pair of probes of a switch S1. So when the sprocket 29a rotates one revolution, the switch S1 produces twelve pulses. With 6 teeth on the drive sprocket 29a, as the camera of 35 mm full size advances the film by one frame for four thirds of its revolution, therefore, the number of pulses produced from the switch S1 is sixteen for each cycle of film winding operation. Needless to say, it is also possible to use a desired number of equal parts of the pulse disc P1. If the duty drive method is employed for controlling the speed of rotation of the motor M2, it is preferred to increase the number of equal parts.

A seventh 2-stage gear 209 is positioned adjacent the sixth one 208 and its small gear 209b meshes always with a spool gear 210 which is fixedly mounted to the bottom of a spool 211. A rubber tube of thin thickness 211a covers the entire area of that portion of the circumferential surface of the spool 211 which receives film to facilitate automatic snatching up of the film leader. A film presser plate 212 is positioned adjacent the outside of the spool 211 and pivotally mounted on a shaft 213. A spring 214 urges the plate 212 toward the spool 211. This film pressing means facilitates automatic convolution of the film on the spool 211. Though only one presser is shown, another one is used on the opposite side.

Another sprocket 29b is driven to rotate by the moving film only. Its rotation is transmitted to a gear 217 through a common shaft and further therefrom to another gear 218 constituting part of the detector. The ratio of the number of teeth of the gear 217 to that of the gear 218 is predetermined to be 3:4. A pulse disc P2 is fixedly mounted on the upper surface of the gear 218, consituting part of each of switches S2 and S3 which produce one pulse for one revolution of the gear 218. The switches S2 and S3 are so arranged that the former is closed earlier than the latter by a time for a prescribed phase of rotation of the pulse disc P2. The pulse from the switch S2 changes the driving mode of the wind-up motor M2 to the duty drive, thereby decelerating the motor M2. For, as the switch S3 produces the pulse in that time, the motor M2 rapidly stops when it has been braked.

To control the wind-up motor M1 in such a manner is to advance the film by one frame of the 35 mm full size. As a matter of course, if the tooth ratio of the gears 217 and 218 is changed to 3:2, or if, with the tooth ratio left unchanged from 3:4, the pulse disc P2 is divided to two equal parts so that for every one-half revolution, one pulse is obtained, the film will be advanced by half size for each shot. If, in this case, two pulses are used to form one cycle of operation of the motor M2, it will also be possible to bring the advanced length of film back to the full size. Further, if the acceptable number of pulses is made to change over between one and two for every one shot, the camera will get a capability of operating with selection of the full and half-sizes frames.

The driving torque of the motor M2 transmits as follows: When the motor M2 rotates in a counterclockwise direction, as all the parts rotate in respective directions indicated by solid line arrows, the gear 204 is rotated in a clockwise direction. Thereby the planetary lever 219a is turned in the same direction to bring the small gear 205a into meshing engagement with the large gear 206a. Thus, a large speed reduction is established: Pinion gear 201→gear 202 (large gear 202a, small gear 202b)→the gear 203 (large gear 203a, small gear 203b) the gear 204 (large gear 204a, small gear 204b)→the gear 205 (large gear 205a, small gear 205b)→the gear 206 (large gear 206a, small gear 206b)→the gear 207→the drive sprocket 29a. Another large speed reduction is also established: The gear 204 (large gear 204a, small gear 204b)→the gear (large gear 208a, small gear 208b)→the gear 209 (large gear 209a, small gear 209b)→the spool gear 210→the spool 22.

Conversely, when the motor M2 rotates in a clockwise direction, as all the parts rotates in respective directions indicated by dashed line arrows, the gear 204 is rotated in the counterclockwise direction. Thereby the planetary lever 219a is turned in the counterclockwise direction to bring the large gear 205a into meshing engagement with the spool gear 210 directly. Thus, a small speed reduction is established: The pinion gear 201→the gear 202 (large gear 202a, small gear 202b)→the gear 203 (large gear 203a, small gear 203b)→the gear 204 (large gear 204a, small gear 204b)→the large gear 205a→the spool gear 210. In this mode, however, the transmission to the drive sprocket 29a is cut off, and the drive sprocket 29a becomes freely rotatable.

Thus, the two transmissions between the motor M2 and the spool 22 are selectively operated depending upon the direction of rotation of the motor M2. Specifically speaking, when in the counterclockwise direction, the spool 22 rotates at a low speed, while when in the clockwise direction, it rotates at a high speed. It is to be noted here that in either case, the direction of rotation of the spool 22 is always counterclockwise.

It should be pointed out that the choice of the counterclockwise rotation of the motor M2 is exercised only when the camera is set to an automatic film loading mode. Because the high speed reduction of the system K2 operates, the sprocket 29a is driven to rotate, pulling the film out of the cartridge, while the fed portion of the film is taken up on the rotating spool 22. In the subsequent or one-frame-at-a-time or continuous run mode, by the clockwise rotation of the motor, the system K2 is switched to the small speed reduction, driving the spool 22 only to rotate at a high speed. Of course, the wind mode may otherwise be operated by the counterclockwise rotation of the motor M2. Even if so, no slack loop of film between the drive sprocket 29 and the spool 22 is formed, because the peripheral speed of the spool 22 is previously adjusted to be faster than that of the drive sprocket 29a. In other words, the sprocket 29a functions as a drive source for the film only when the film is not pulled by the spool 22. For the other time, it acts merely as an idler.

Figure 6:
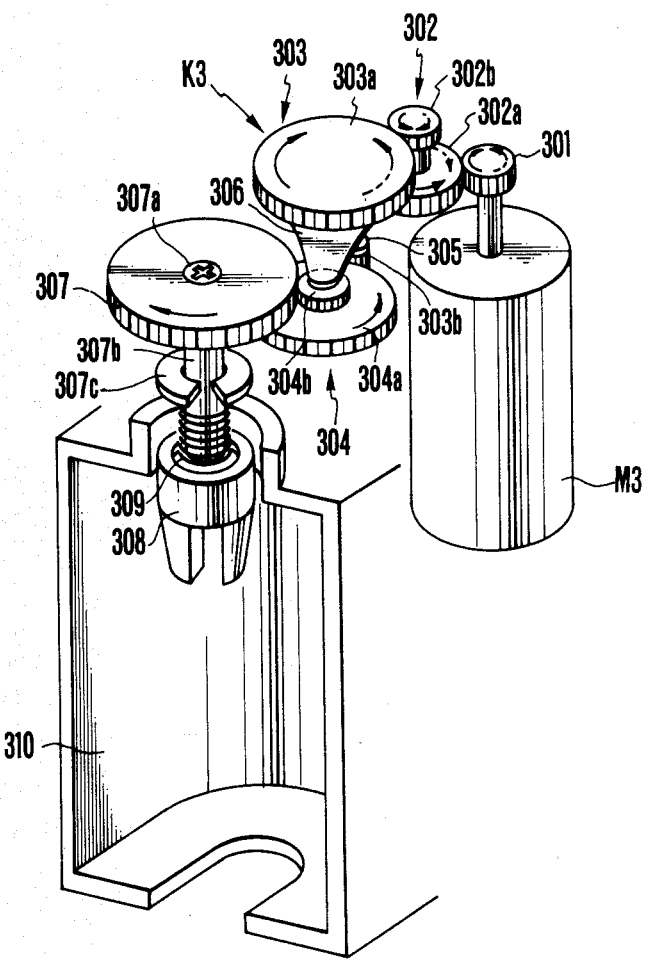
FIG. 6 is a perspective view of a rewind transmission system.

In FIG. 6, a torque transmission K3 of the rewind motor M3 is shown in detail. A pinion gear 301 on the output shaft of the motor M3 meshes with a large gear 302a of a 2-stage gear 302 whose small gear 302b meshes with a large gear 303a of another 2-stage gear 303. A planetary lever 306 is pivotally mounted on a common shaft of the gear 303. A compression spring 305 between the small gear 303b and the planetary lever 306 urges the latter in frictional contact with the large gear 303a. By this frictional contact, the planetary lever 306 is caused to follow up the direction of rotation of the gear 303. The free end of the planetary lever 306 rotatably carries a third 2-stage gear 304 having a large gear 304a and a small gear 304b. A gear 307 is fixedly mounted to one end of a shaft 307b by a screw fastener 307a, the opposite end of which movably carries a rewind fork 308. The fork 308 projects into a cartridge chamber 310 and is arranged to be engageable with a hub of the film cartridge (not shown). Positioned between a collar 307c on the shaft 307b and the shoulder of the fork 308 is a coil spring 309 to allow for the fork 308 to retract from the chamber when the film cartridge is inserted thereto or removed therefrom.

When the motor M3 rotates in a clockwise direction, the gear 303 is rotated in the same direction together with the planetary lever 306, thereby the small gear 304b is brought into meshing engagement with the gear 307. Thus, a driving torque transmission is established: The pinion gear 301→the gear 302 (large gear 302a, small gear 302b)→the gear 303 (large gear 303a, small gear 303b)→the gear 304 (large gear 304a, small gear 304b)→the gear 307 the fork 308. Conversely, when the motor M3 rotates in a counterclockwise direction, the planetary lever 306 is turned in the same direction, thereby that transmission is cut off in between the small gear 304b and the gear 307. Hence, in the wind mode, the rewind motor M3 and transmission K3 do not partake in increasing the load on the winding-up motor M2, it being sufficient for the rewind motor M3 to rotate in the counterclockwise direction for a few degrees.

Though in each of the transmission systems K1 to K3, shown in FIGS. 4 to 6, use is made of the planetary gear in changing over between two values in the speed reduction ratio in automatic response to change of the direction of rotation of the motor, it is also possible to use a non-way clutch as such means.

Figure 7:
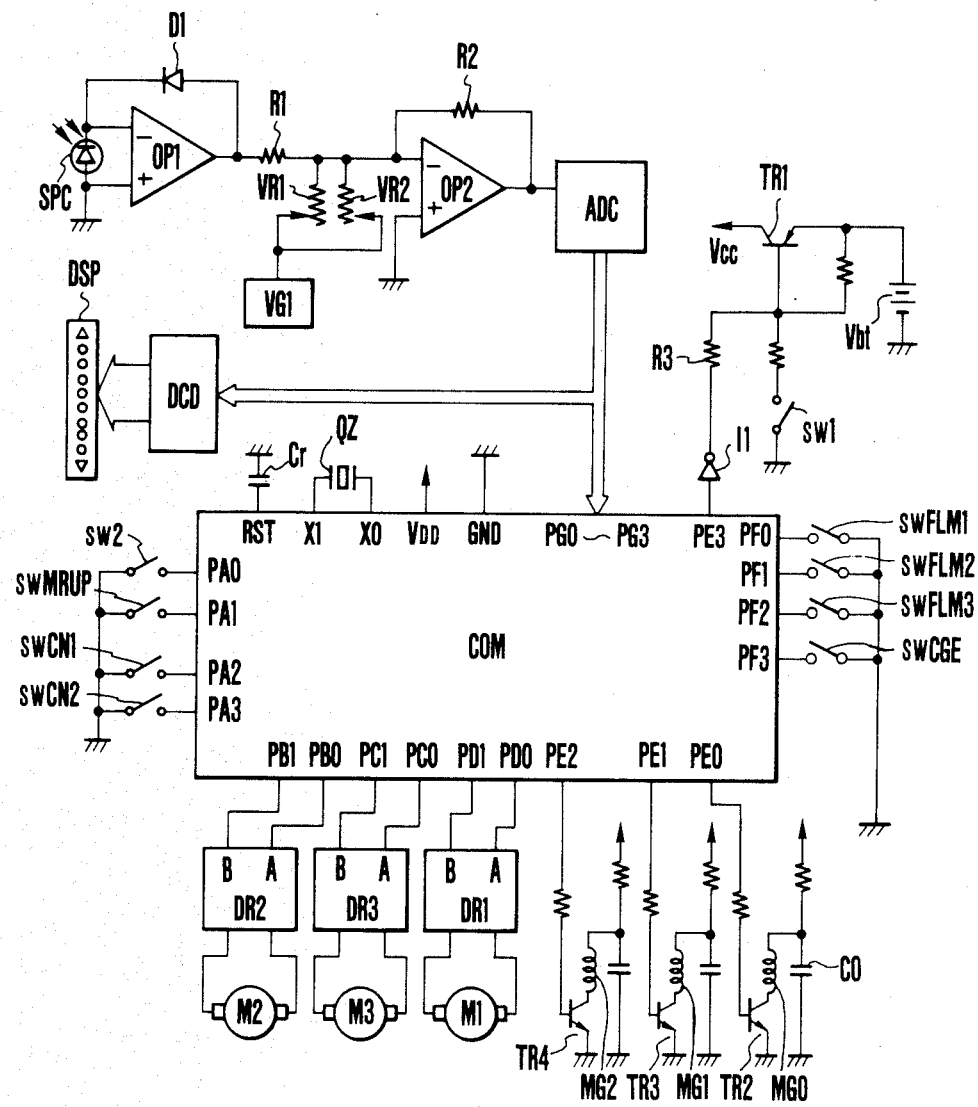
FIG. 7 is an electrical circuit diagram of a microcomputer and its peripheral circuits.

FIG. 7 illustrates a practical example of the circuitry of the camera in which use is made of a microcomputer COM as the control means. A silicon photo cell SPC is positioned to receive light from an object to be photographed and is connected between two inputs of an operational amplifier OP1 of high input impedance with compression diode D1 connected in the feedback loop thereof. The operational amplifier OP1 produces an output signal Bv representing the logarithm of the brightness of the object through a resistor R1. Variable resistors VR1 and VR2 are connected to a constant voltage generator VG1 and produce film sensitivity information Sv and aperture value information Av. Another operational amplifier OP2, having a resistor R2 in the feedback loop thereof, computes an exposure value, i.e. shutter time information Tv based on the formula: $Tv=(Bv+Sv-Av)$. The shutter time information Tv is converted to a 4-bit digital value by an A/D converter ADC and then displayed by display device DSP within the finder through a decoder driver DCD, and applied to input ports PG0 to PG3 of the microcomputer COM. It should be noted that the 4-bit binary coded values [0001] to [1000] correspond to 1/1000 sec. to 1/8 sec. and the values [0000] and [1001] or more represent warning signals in the display.

When a release button is pushed down to a first stroke, a power switch sw1 is closed, thereby a transistor TR1 is turned on to supply electrical power as a voltage Vcc from a battery Vbt to the various portions of the circuitry. Though not given the Vcc-labelled arrow in the drawing, the operational amplifiers and the A/D converter, for example, are of course supplied with the electrical power. Even after the switch sw1 is opened, the power supply is sustained so long as an output port PE3 of the microcomputer COM produces a signal of low level which is applied through an inverter I1 and a resistor R3 to the base of the transistor TR1.

The microcomputer COM has a terminal RST connected to a capacitor Cr at one pole thereof the opposite pole being grounded; terminals X0 and X1 between which is connected a quartz oscillator QZ; another terminal VCC connected to the voltage source Vcc; and another terminal GND grounded.

The microcomputer COM input ports PA0 to PA3 are respectively connected to a release switch sw2 arranged to turn on when the release button is pushed down to a second stroke; a mirror-up sensing switch swMRUP arranged upon mirror-up to turn off and upon mirror-down to turn on; a shutter opening sensor or switch swCN1 arranged to turn off or on when the leading blade group of the shutter has run down or charged, respectively; and a shutter closing sensor or switch swCN2 arranged to turn off or on when the trailing blade group of the shutter has run down or charged, respectively.

Input ports PF0 to PF3 are respectively connected to a first film switch swFLM1 comprising the pulse dsc P1 and the pair of contacts S1 (FIG. 5); a second film switch swFLM2 comprising the pulse disc P2 and the pair of contacts S2 (FIG. 5); a third film switch swFLM3 comprising the pulse disc P2 and the pair of contacts S3 (FIG. 5); and a charge switch swCGE comprising the signal disc on the cam gear 109 (FIG. 4) and the pair of contacts S0 and arranged to turn on when the charging operation is completed.

The microcomputer COM output ports PE0 to PE2 are connected to the bases of transistors TR2 to TR4, respectively, controlling the current supply to a permanent magnet-equipped solenoid MG0 of the first latch for beginning a mechanical release operation, a leading blade group release solenoid MG1 and a trailing blade group release solenoid MG2.

Output ports PB0 and PB1 are connected to a drive circuit DR2 for the wind-up motor M2. Further output ports PC0 and PC1 are connected to a drive circuit DR3 for the rewind motor M3. Output ports PD0 and PD1 are connected to a drive circuit DR1 for the charge motor M1.

Figure 8:
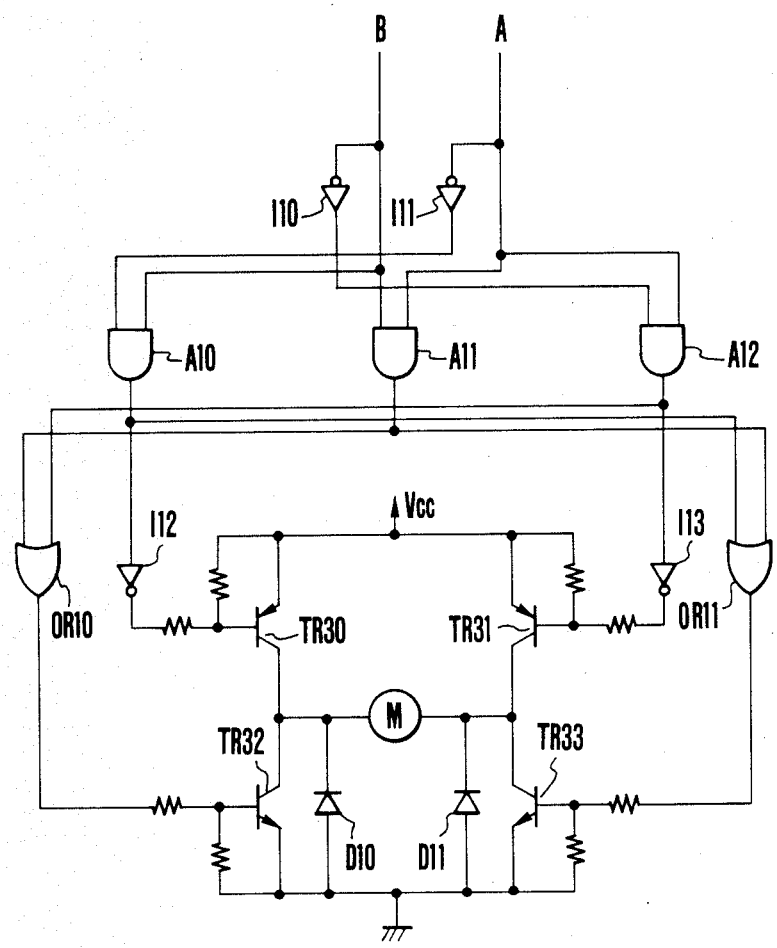
FIG. 8 is an electrical circuit diagram of a drive circuit.

FIG. 8 illustrates the details of each of the drive circuits DR1 to DR3, where two input terminals A and B receive a 2-bit signal. At first, for A=1, B=0, because the input B is inverted by an inverter I10, the output of an AND gate A12 is "1", and the output of OR gate OR10 is also "1", thereby turning on a transistor TR32. Also, because the output of an inverter I13 is "0", a transistor TR31 also is turned on. Therefore, the voltage Vcc of the battery is applied across the motor M with current flowing in such a direction that the motor M rotates in a normal direction.

For A=0, B=1, because the input A is inverted by an inverter I11, the output of an AND gate A10 becomes "1", the output of an OR gate OR11 also becomes "1", and the output of an inverter I12 becomes "0", thereby turning on transistors TR30 and TR33. As current flows to the motor M in the reverse direction, the motor M rotates in the reverse direction.

For A=1, B=1, the output of an AND gate A11 is "1". Therefore, the outputs of the OR gates OR10 and OR11 take "1" simultaneously, turning on the transistors TR32 and TR33. Hence, if this signal appears at a time during the rotation of the motor M, not only the current supply to the motor is cut off no matter which direction of rotation of the motor M may be by diodes D10 and D11 and the transistors TR32 and TR33, but also the winding of the motor M is short-circuited to brake the motor M against the further rotation by inertia.

When A=0, B=0, all the outputs of the AND gates A10 to A12 have "0", causing the transistors TR30 to TR33 all to turn off, so that the motor M is in an open state.

Figure 9B:
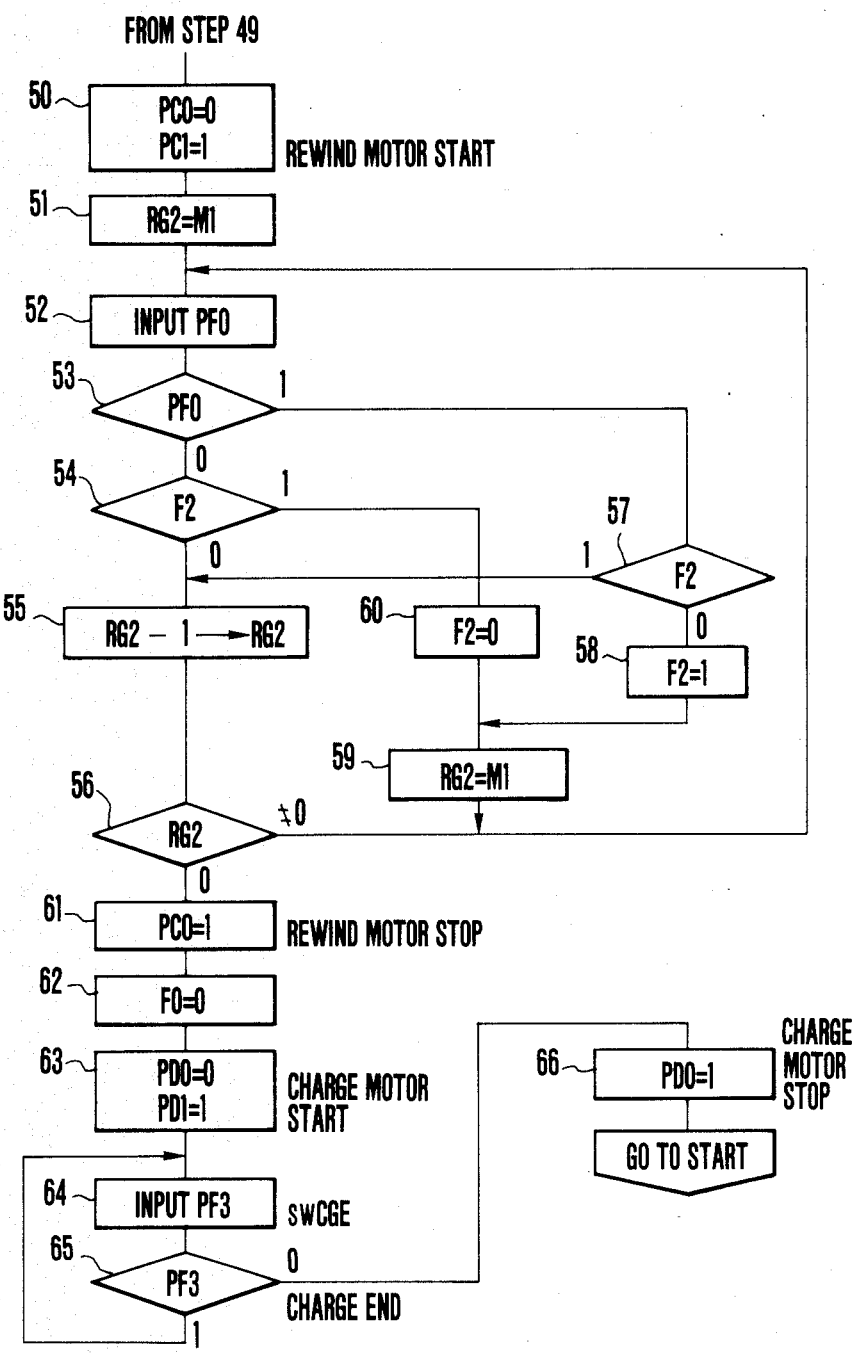
Figure 10:
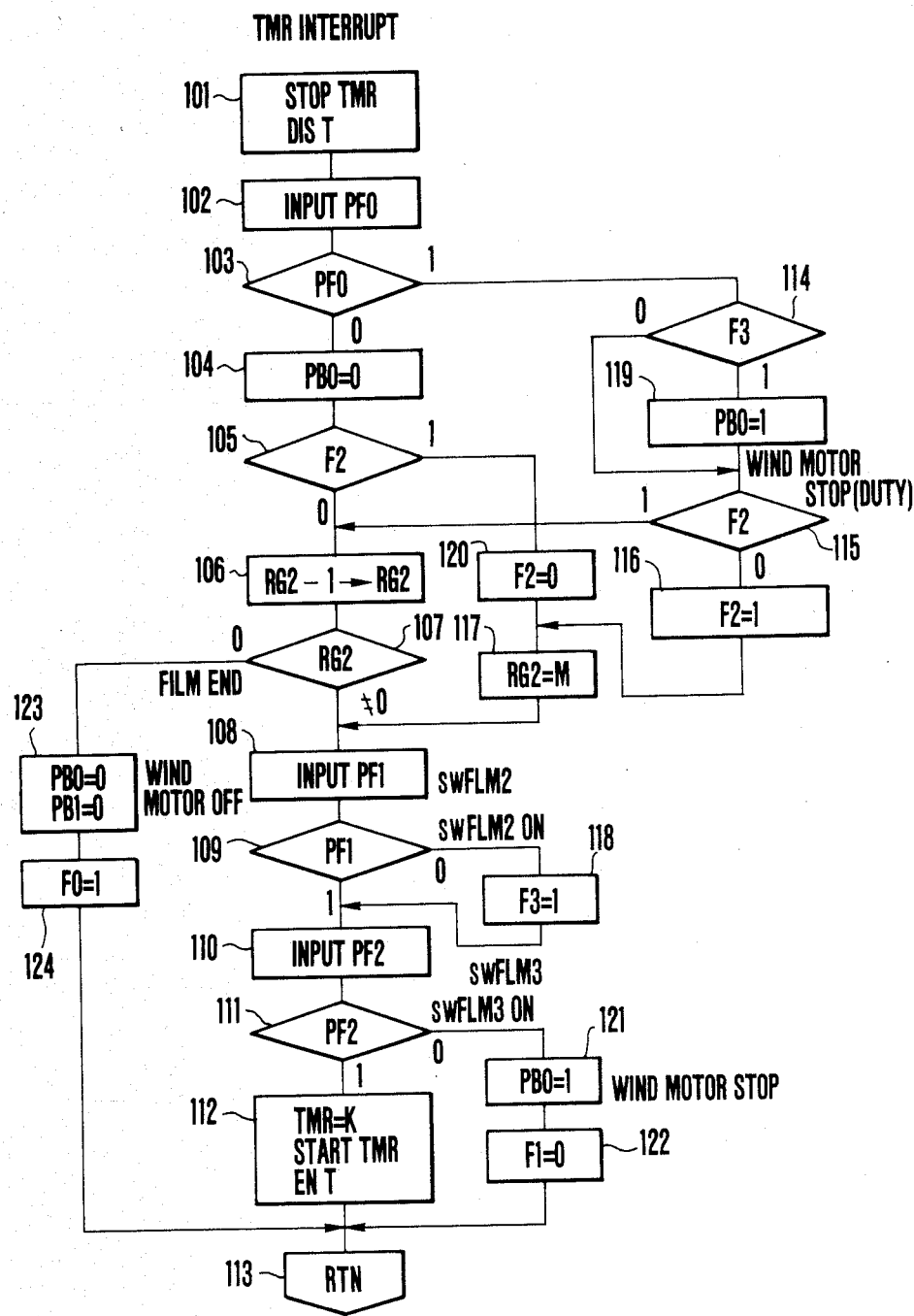

The operation of the microcomputer COM is next explained in detail by reference to the flowchart of FIGS. 9A, 9B and 10.

Step 1: By the supply of the battery voltage Vcc in response to closure of the first stroke dependent switch sw1, the microcomputer COM is started to operate. A train of clock pulses from the quartz oscillator QZ are received, and at the same time, a power-on reset is executed by the capacitor Cr. A built-in program counter is initialized to a No. 0 address, causing program execution to begin with the block labeled "START". Here, all the flags are assumed to have "0" and all the output ports also to have "0".

Step 2: Inputs from the ports PA0 to PA3 (hereinafter referred to as "PA" inputs, and this holds for the other ports) are received. If all the portions of the camera are in their charged positions, then when the photographer further pushes down the release button to the second stroke, PA0=PA1=PA2=PA3=0 result. Thus, the PA inputs have a value of [00H] in the hexadecimal number system.

Step 3: If the PA inputs are [00H], jump to step 5. If not, advance to step 4.

Step 4: Now assuming that the PA inputs are not [00H], then the PE3 output is changed to "0". Since, at the time of the power-on reset, all the output ports are "0", this command is meaningless. But because the program has a loop to step 1, it is at that time that it has meaning. (Latch release of the battery voltage Vcc).

Step 5: When the PA inputs are [00H], or when the photographer pushes the release button to the second stroke, procedure to exposure mode is executed. The PE3 output becomes "1", sustaining the ON state of the transistor TR1 to latch the voltage Vcc. Step 6: The APEX value Tv of shutter time, in the form of a 4-bit digital value from the A/D converter ADC, is introduced. Since the number of bits is four, the possible decimal numbers are "0" through "15".

Step 7: Since the PG inputs of step 6 are stored in an accumulator A, this value is transferred to an internal register RG1.

Step 8: The PE0 output is changed to "1", causing the transistor TR2 to turn on so that the capacitor C0, which has so far been charged to almost equal a voltage to the battery voltage Vcc, is suddenly discharged to the first latch control solenoid MG0. Thereby, a mechanical release is actuated.

Step 9: The flow is held for a certain time by a timer. A program for this purpose is, for example, to put a certain value into the accumulator A, and then subtract one by one from that value until A=0. The time necessary to do this may be used as the holding time. The program procedure is not shown because the flow chart would become very complicated. For note, TIME2 to TIME4 have similar programs.

Step 10: The PE0 output is then changed to "0", thereby the current supply to the first latch control solenoid MG0 is cut off. TIME1 may be determined to be slightly longer than the minimum time for which the first latch control solenoid MG0 is energized. After that, the mechanical sequence of operation goes on so that the diaphragm is closed down to the presetting, and the mirror is moved upward.

Step 11: The PA1 input, representing the movement of the mirror, is taken up. In a certain time from the release of the mirror from the latching connection by MG0, the mirror should reach the terminal end of movement. Step 12: A routine for waiting until the mirror reaches the non-viewing position. When this position is reached, step 13 is executed. This routine is provided for ascertaining that the mirror has completely moved away from the light path to the exposure aperture, before the shutter is opened.

Step 13: The flag F0 is examined. F0=1 represents the film end.

Step 14: The flag F1 is examined. F1=0 represents the termination of each cycle of film winding operation.

Step 15: Whether or not the value of the internal register RG1 is "0" is examined. As has been described above, when the computed shutter time is shorter than 1/1000 sec., the PG inputs take "0000", or RG1 =1.

Step 16: If RG1 =0, it is forced to RG11, or the shutter time is fixed to 1/1000 sec.

Step 17: Whether or not RG1>8, or the shutter time is longer than ½ sec., is examined.

Step 18: If RG1>8, it is forced to RG1=8, or the shutter time is fixed to ½ sec.

Step 19: The accumulator A is incremented by "1". Routines in steps 19 to 22 are to convert the value of the internal register RG1, representing the sutter time, to elongate as multiplied by 2 in sequence.

Step 20: "1" is subtracted from the value of the internal register RG1, and then put again into it.

Step 21: Whether or not RG1 =0 is examined. If it is "0", jump to step 23. If not, advance to step 22.

Step 22: The content of the accumulator A is shifted to the left, or doubled. On assumption that the accumulator A has 8 bits, then when, for example, RG1 =8, the content of the accumulator A is shifted 7 times. Since the initial content of the accumulator A was [00000001], it, therefore, becomes [10000000].

Step 23: The content of the accumulator A is transferred to the internal register RG1. Thus, the shutter time is elongated in multiplied-by-2 serial fashion.

Step 24: The PE1 output is changed to "1", causing the leading blade group control solenoid MG1 to be supplied with current. The leading blade group starts running.

Step 25: A waiting time is formed by a constant time timer.

Step 26: The content of the internal register RG1 is reduced by "1".

Step 27: The steps 25 to 27 are repeated until the content of the internal register RG1 becomes "0". In this step, an actual time of the shutter time is counted.

Step 28: The PE2 output is changed to "1", causing the trailing blade group control solenoid MG2 to be supplied with current. The trailing blade group runs down, terminating the operation of the focal plane shutter.

Step 29: A time necessary for the trailing blade group to travel across the film gate is formed by a constant time timer.

Step 30: Reset to PE1=PE2=0. So the leading and trailing blade group control solenoids MG1 and MG2 are deenergized.

Step 31: An input from the trailing blade group sensor switch swCN2 is taken up. Step 32: A routine for waiting swCN2 to open or waiting up for the completion of the running down of the trailing blade group. When it has run down, advance to step 33.

Step 33: PD0=1, PD1 =1 render the drive circuit DR1 operative. The charge motor M1 starts to rotate. Thereby, the shutter, mirror and automatic diaphragm are charged.

Step 34: Wait for a time from the start of current supply to the motor M1 to start energization of the up motor M2, until the current flowing through the winding of the motor M1 becomes stable. Thereby, the rush of currents in the initial stages of operation of the motors M1 and M2 are prevented from superimposing one upon another.

Step 35: PB0=0, PB1=1 render the drive circuit DR2 operative. The motor M2 starts to rotate. Thereby, the film is wound up.

Step 36: Set a constant K in a timer TMR for timer interruption. K is taken at a value depending on the winding-up speed of the film, the number of equally divided parts of the pulse disc P1 (FIG. 5) of the first film switch swFLM1, and the period of instruction cycle of the microcomputer COM.

Step 37: Start the timer TMR for timer interruption. Enable the timer interruption (EN T). Input a constant M into the internal register RG2. Set the flags F0=F2=F3=0, F1=1. The flag F2 represents the ON or OFF state of the first film switch swFLM1, and the flag F3 represents the ON or OFF state of the second film switch swFLM2. The timer TMR since started is decremented repeatedly independently of the main program routine. For every prescribed time (dependent on the constan K), interruption is effected with a jump from the executed program to a specific timer interruption address. Here, the timer interruption procedure is explained by reference to FIG. 10.

Timer Interruption Procedure

Step 101: Prohibit decrement and interruption of timer TMR.

Step 102: Input PF0 from the first film switch swFLM1.

Step 103: If PF0=0, advance to step 104. If PF0=1, jump to step 114.

Step 104: Because PB0 remains the same as that set in step 35, the current supply to the wind-up motor continues.

Step 105: Test flag F2. Because F2 has been set in step 37, advance to step 106.

Step 106: Decrease the content of the internal register RG2 by "1".

Step 107: Test RG2=0. Since, in the up-to-present program, RG2=M−1, for, as M is somewhat large a value, it does not become "0", advance to step 108.

Step 108: Input PF1 from the second film switch swFLM2.

Step 109: Test PF1=0. If the film is not being advanced just before the terminal end of length of one frame yet, PF1=1. So, advance to step 110.

Step 110: Input PF2 from 3rd film switch swFLM3.

Step 111: Test PF2=0. If the cycle of film winding operation is not completed yet, PF2=1. So advance to step 112.

Step 112: Set the constant K in the timer register again, causing the timer TRM to start so that interruption is enabled.

Step 113: Return to the original program under execution. The timer interruption subroutine is to turn away from the program under execution to going for testing the states of the three firm switches swFLM1, swFLM2 and swFLM3 in every certain time. Since the program itself goes with the instruction each of which is executed at a very high speed, the recycling of the input of film winding up information in the certain period does not actually give rise to a problem.

Now assuming that a certain cycle of execution of the timer interruption subroutine is encountered with opening of the first film switch swFLM1, then jump from step 103 to step 114.

Step 114: Test flag F3=1. Since F3=0 has been set to step 37, advance to step 115.

Step 115: Test flag F2=1. Since F2=0 has been set in step 37, addvance to step 116.

Step 116: Set flag F2 to "1". This means that the first film switch swFLM1 has turned off, in other words, the input PF0 has changed to 1.

Step 117: Set again the internal register RG2 to the constant M. Then, jump to beginning of the aforesaid subroutine with step 108. Here, for a little while, the winding-up is carried out. Suppose a moment just before the terminal end of one-frame movement of the film. Since, at this time, the second film switch swFLM2 turns on, PF1=0 appears, causing step 109 to be followed by step 118.

Step 118: Set flag F3 to "1". In the subsequent cycle of execution of the timer interruption subroutine, therefore, a jump to step 119 occurs at step 114.

Step 119: Set PB0=1. Since PB1=1 has been set in step 37, the wind-up motor M2 is deenergized, and, at the same time, braked. But inertia does not allow the motor M2 to stop immediately. So it continues rotating. By the subsequent cycle of execution of the timer interruption subroutine, as the first film switch swFLM1 changes from OFF to ON, step 103 is followed not by step 114, but by step 104. Since PB0=0 takes place again, the motor M2 is energized for the second time. Since, at this time, F2=1 as has already been set in step 116, advance to step 120.

Step 120: Set flag F2 to "0", and then jump back to step 117 where the constant M is set in the internal register RG2. In conclusion, after the second film switch swFLM2 turns on, that is, the winding up nears completion, as the ON-and-OFF operation of the first film switch swFLM1 recycles, the motor M2 is put under duty control to repeat driving-braking-driving-braking and so on. Thus, it is being decelerated.

When the cycle of film winding operation has completed, the third film switch swFLM3 is turned on. So, a jump from step 111 to step 121 takes place.

Step 121: Brake the motor M2 as in step 119.

Step 122: Set flag F1 to 0, which represents the termination of the film winding operation. Then, jump back to step 113 where the subroutine transits to the original program. Because step 112 is not in the path, no more interruption occurs.

Next assuming that the used film is of 24-exposure length, and the 24th frame has just been exposed, then energization of the motor M2 will only result in tension of the film. So, the first film switch swFLM1 can no longer turn on and off, causing the flag F2 to be left unchanged from "0" or "1". In step 106, therefore, the content of the internal register RG2 is subtracted by 1 in each cycle of execution of the timer interruption subroutine. When RG2=0 is reached in some cycle number, a jump from step 107 to step 123 takes place.

Step 123: Set PB0=PB1=0, causing both ends of the winding of the motor M2 to open.

Step 124: Set flag F0=0, which represents the film end.

The above-described loop beginning with the step 37 of the main routine is executed always until the next shot goes to step 15. Thus, the film winding operation is controlled accurately.

We now proceed to explain the remain of the main program routine.

Step 38: Input a signal representing that the shutter, mirror and automatic diaphragm have been charged from the charge switch swCGE.

Step 39: A routine comprised together with step 38 for waiting until the charging is completed. Of course, during this time, a necessary number of cycles of timer interruption procedure are carried out.

Step 40: Change PD0 output to 1, causing the charge motor M1 to be braked.

Step 41: Test the flag F0 which represents the film end. Now suppose the film is not all exposed, then advance to step 42.

Step 42: Similar to step 2.

Step 43: If the photographer continues pushing the release button with intention of shooting in the continuous run mode, the second-stroke dependent switch sw2 remains ON, so that the PA inputs have a hexadecimal number of [00H], causing a jump back to step 6: NEXT.

With the step 6, as has been described above, the photographing sequence begins. It should be pointed out here that without making determination of when the film winding operation is terminated, step 8 is executed to activate the first latch control solenoid MG0. In fact, the preparation for an exposure or the adjustment of the diaphragm to the presetting and the upward movement of the mirror, is carried out regardless of whether or not the film winding operation in the preceding shot is terminated, thereby giving an advantage that the firing rate of shots is increased. After that, the termination of upward movement of the mirror is determined in step 12, and the termination of the film winding operation is determined in step 14. Until now, the timer interruption is repeated any number of times. Upon detection of the termination of the film winding operation, advance to the next step for shutter control.

Next explanation is given to the single frame shooting mode. Since, after each shot, the photographer must have continued pushing the release button in the second stroke, step 43 is followed by step 44.

Step 44: Test the completion of the winding by the timer interruption procedure, or F1=0. If not, repeat steps 41 to 44. Upon completion of the winding, jump back to step 1: START. In step 4, the battery voltage Vcc is then released from the latching. If the first stroke dependent switch sw1 also is OFF, the supply of the voltage Vcc is cut off.

Rewind Procedure

When the film is tensioned at an intermediate point during the winding operation, the execution of the timer interruption subroutine results in F0=1, causing the flow to be branched from step 41 to step 45.

Steps 45-47: Energize solenoid MG2 for a certain time, causing the trailing blade group to run down as in steps 28 to 30. In this way, the film is protected against fogging when it happens that the photographer while having carelessly taken the lens off the camera body and exposing the shutter to strong light, carries out the rewinding. Since both the leading and trailing blade groups are present in front of the exposure aperture, the strong light can be shut out perfectly from the film surface Step 48: Input a signal from the trailing blade group sensing switch swCN2.

Step 49: Wait for the completion of running down of the trailing blade group. Upon completion, then advance to step 50.

Step 50: Set PC0=0, PC1=1, causing the rewind motor M3 to rotate.

Step 51: Set the internal register RG2 to M1. Steps 52-60: Determine when the film leader comes across the drive sprocket 29a. This program for detecting the stoppage of the sprocket 29a from further rotation is similar to the film motion detecting program described in connection with the steps 102, 103, 105, 106, 107, 115, 116, 117 and 120 of the timer interruption procedure. Upon completion of the rewinding, then advance to step 61.

Step 61: Change to PC0=1, causing the rewind motor M3 to stop.

Step 62: Reset flag F0 to "0" which represents the film ends.

Step 63: Set PD0=0, PD1=1, causing energization of the charge motor M1. This is because the trailing blace group ran down in step 45 to prepare for the rewinding, Step 64: Input a signal from the charge switch swCGE.

Step 65: Wait for the completion of the charging before an advance to step 66.

Step 66: Stop the motor M1. Thus, the rewind procedure all comes to end. Exit this subroutine.

In connection with the continuous shooting mode, we should consider a particular situation where the charging of the shutter, mirror and automatic diaphragm terminates so far earlier than the termination of the film winding operation that after the first control solenoid MG0 has been energized to actuate the next camera release, the film is tensioned, as the film end comes up.

In this situation, though the diaphragm has been closed down and the mirror has been moved upward in response to energization of the solenoid MG0, the film gets stopped from further movement to the length of one frame so that the third film switch swFLM3 remains OFF. If the camera is automatically switched to the rewind mode even under such conditions, the photographer would mistake the execution of the rewinding operation as that the shutter has opened and closed. So he would later have an erroneous management. Also, because the mirror is held in the non-viewing position, when the lens is pointed toward a very intense light source, the film will be fogged. For this reason, it is recommended to set the mirror down before the film is rewound.

Upon detection of the film end in the timer interruption procedure at a time after the mirror-up has been determined in step 12 and when the completion of the winding is waited in steps 13 and 14, for the flag F0 is set "1" in step 124, the flow is branched at step 13 to step 67.

Step 67: Change to PD0=0, PD1=1, causing the motor M1 to rotate.

Steps 68-69: Detect the charge end.

Step 70: Change to PD0=1, causing the motor M1 to be braked. Thereupon, the mirror is charged, returning down to the initial position. Then jump back to step 45: RWND, and initialize the rewind procedure.

In the embodiment of the invention, as is understandable from the foregoing explanation, since the three separate motors are used solely for winding up film, charging the shutter and other mechanisms and rewinding the film independently of one another, respectively, even for, as the film comes to be tensioned at a time when the film is being wound up, the cycle of film winding up operation is not completed, it is possible to insure that the charging operation can terminate without fail. To transit from the wind to the rewind mode in automatic response to detection of the fact that the film has been tensioned, therefore, it results that before the energization of the rewind motor starts, the apertured portion of the shutter unit is covered not by the trailing blade group but by the leading blade group. In addition to this feature, according to the invention, the start of energization of the rewind motor is preceded by an operation represented by the steps 45 to 47 so that the trailing blade goup is brought into superimposition on the leading blade group before the rewinding of film starts. Thus, the exposure aperture is shuttered up by both leading and trailing blade group with an advantage of preventing light from leaking to the film through a slit appearing between the blades of the blade group by their deformation.

Also, the present invention is applicable to another type of camera in which the winding up of film and the charging of the shutter are carried out by a common motor.

Also, the present invention is applicable to another type of camera in which the wind mode transits to the rewind mode not automatically but manually. In this case, there is need only to slightly modify the current supply control in such a manner that the actuation of a manual switch for selection of the modes leads to energize the member (for example, solenoid) for holding the trailing blade group of the shutter just before the rewinding of film starts.

Also, the rewinding of film is not necessarily motorized. It may be carried out by hand, as a matter of course. Also in application to the camera which is switched to the manual or motorized rewind mode by pushing down a button usually called "R" button to free the sprocket, the R button may be made to also serve as an actuator for releasing the trailing blade group just before the rewinding of film starts.

The result of the presence of both blade groups of the shutter in the apertured portion from the transition to the rewind mode may otherwise be effected, when the shutter resetting mechanism is constructed in such a form that substantially the leading blade group only is made chargeable. In this case, the performance of the charging operation suffices for putting both blade groups of the shutter up to the apertured portion before the rewinding of film starts.

According to the present invention, with the camera in the rewind mode, despite the static electricity, which will be produced by the frictional movement of the film with the film gate, or the swirling of air, which will accompany the fast speed continuous running of the film, deforms the blade groups of the shutter with the appearance of slits between the blades in each blade group, the film can be protected against light leakage by putting not only one of the blade groups but also the other blade group into the apertured portion.

What is claimed is:

1. A camera comprising:
    (a) detecting means for detecting a start of rewinding of a film;
    (b) a shutter constructed with a leading blade group and a trailing blade group which are able to open and close an aperture area, said leading blade group being placed at a closed position of said aperture area in an exposure preparatory state and being caused to run from said closed position to an open position by first driving means which is initiated by a release for starting an exposure of said film, while said trailing blade group being placed at an opened position of said aperture area at least immediately before an exposure operation and being caused to run from said opened position to a closed position by second driving means which is initiated after said first driving means has been initiated, thus completing an exposure of said film; and
    (c) control means responsive to an output of said detecting means representing an initiation of film rewinding, for running only the trailing blade group, said second driving means causing said trailing blade group of the shutter to run so that said trailing blade group is forced to run to said closed position of the aperture area during the film rewinding thus providing a light shielding for said aperture area.

2. A camera according to claim 1, wherein said detecting means detects stoppage of film from further advancing as it is tensioned at an intermediate point during one cycle of film winding up operation to produce an output representing the start of the rewinding of the film.

3. A camera according to claim 1, wherein said second driving means for the trailing blade group said shutter is made of an electromagnet.

4. A camera according to claim 3, wherein said electromagnet is caused to run the trailing blade group of the shutter by controlling a current supply to a coil of the electromagnet.

5. A camera comprising:
   (a) detecting means for detecting completion of winding up of all film frames;
   (b) a shutter constructed with a leading blade group and a trailing blade group which are able to open and close an aperture area, said leading blade group being placed at a closed position of said aperture area in an exposure preparatory state and being caused to run from said closed position to an open position by first driving means which is initiated by a release for starting an exposure of said film, while said trailing blade group being placed at an opened position of said aperture area at least immediately before an exposure operation and being caused to run from said opened position to a closed position by second driving means which is initiated after said first driving means has been initiated, thus completing an exposure of said film; and
   (c) control means responsive to an output of said detecting means representing a completion of winding up of film for running only the trailing blade group, said second driving means causing said trailing blade group of the shutter to run so that said trailing blade group is forced to run to said closed position of the aperture area during the film rewinding thus providing a light shielding for said aperture area.

6. A camera according to claim 5, wherein said detecting emans detects stoppage of the film from further advancing, as it is tensioned at an intermediate point during one cycle of film winding up operation, to produce an output representing that all frames of the film have been wound up.

7. A camera according to claim 5, wherein said second driving means for the trailing blade group of said shutter is made of an electromagnet.

8. A camera according to claim 7, wherein said electromagnet is caused to run the trailing blade group of the shutter by controlling a current supply to a coil of the electromagnet.

9. A camera comprising:
   (a) a first motor;
   (b) means for winding up a film by using said first motor as a drive source;
   (c) a shutter constructed with a leading blade group and a trailing group which are able to open and close an apertured area, said leading blade group being placed at a closed position of said aperture area in an exposure preparatory state and being caused to run from said closed position to an open position by first driving means which is initiated by a release for starting an exposure of said film, while said trailing blade group being placed at an opened position of said aperture area at least immediately before an exposure operation and being caused to run from said opened position to a closed position by second driving means which is initiated after said first driving means has been initiated, thus completing an exposure of said film;
   (d) a second motor;
   (e) means for charging said shutter by using said second motor as a drive source;
   (f) detecting means for detecting a start of a rewinding of the film; and
   (g) control means, responsive to an output of said detecting means representing an initiation of film rewinding, for running only the trailing blade group, said second driving means causing said trailing blade group of the shutter to run so that said trailing blade group is forced to run to said closed position of the aperture area during the film rewinding thus providing a light shielding for said aperture area.

10. A camera comprising:
    (a) a first motor;
    (b) means for winding up a film by using said first motor as a drive source;
    (c) a shutter constructed with a leading blade group and a trailing blade group which are able to open and close an apertured area, said leading blade group being placed at a closed position of said aperture area in an exposure preparatory state and being caused to run from said closed position to an open position by first driving means which is initiated by a release for starting an exposure of said film, while said trailing blade group being placed at an opened position of said aperture area at least immediately before an exposure operation and being caused to run from said opened position to a closed position by second driving means which is initiated after said first driving means has been initiated, thus completing an exposure of said film;
    (d) a second motor;
    (e) means for charging said shutter by using said second motor as a drive source;
    (f) detecting means for detecting completion of winding up of all film frames; and
    (g) control means, responsive to an output of said detecting means representing the completion of winding up of film, for running only the trailing blade group, said second driving means causing said trailing blade group of the shutter to run so that said trailing blade group is forced to run to said closed position of the aperture area during the film rewinding thus providing a light shielding for said aperture area.

11. A camera comprising:
    (a) a first motor;
    (b) means for winding up a film by using said first motor as a drive source;
    (c) a second motor;
    (d) means for rewinding the film by using said second motor as a drive source;
    (e) detecting means for detecting completion of winding up of all film frames;
    (f) a shutter constructed with a leading blade group and a trailing blade group which are able to open and close an apertured area, said leading blade group being placed at a closed position of said aperture area in an exposure preparatory state and being caused to run from said closed position to an open position by first driving means which is initiated by a release for starting an exposure of said film, while said trailing blade group being placee at an opened position of said aperture area at least immediately before an exposure operation and being caused to run from said opened position to a closed position by second driving means which is initiated after said first driving means has been initiated, thus completing an exposure of said film; and (g) control means, responsive to an output of said detecting means representing the completion of windings up of film, for running only the trailing blade group, said second driving initiating means causing said trailing blade group to run, and after that, for driving said second motor to cause the film to be rewound so that said trailing blade group is forced to run to said closed position of the aperture area during the film rewinding thus providing a light shielding for said aperture area.

12. A camera comprising:
(a) film winding up means for driving a film in a winding up direction;
(b) film rewinding means for driving the film in a rewinding direction;
(c) a shutter constructed with a leading blade group and a trailing blade group which are able to open and close an apertured area, said leading blade group being placed at a closed position of said aperture area in an exposure preparatory state and being caused to run from said closed position to an open position by first driving means which is initiated by a release for starting an exposure of said film, while said trailing blade group being placed at an opened position of said aperture area at least immediately before an exposure operation and being caused to run from said opened position to a closed position by second driving means which is initiated after said first driving means has been initiated, thus completing an exposure of said film;
(d) changeover means for changing over from a driving state of winding up the film by said film winding up means to another driving state of rewinding the film by said film rewinding means; and
(e) control means for running only the trailing blade group, said second driving means causing said trailing blade group of said shutter to run prior to the changing over to the film rewinding drive state by said changeover means so that said trailing blade group is forced to run to said closed position of the aperture area during the film rewinding thus providing a light shielding for said aperture area.

13. A camera comprising:
(a) a shutter constructed with a leading blade group and a trailing blade group which are able to open and close an aperture area, said leading blade group being placed at a closed position of said aperture area in an exposure preparatory state and being caused to run from said closed position to a opened position by first driving means which is initiated by a release for starting an exposure of said film, and said trailing blade group being placed at an opened position of said aperture area at least immediately before an exposure operation and being caused to run from said opened position to a closed position by second driving means which is initiated after said first driving means have been initiated thus completing an exposure of said film; and
(b) control means for causing said trailing blade group to run at a time of film rewinding thus placing the same at said closed position of the aperture area, said control means forcibly initiating only said second driving means for making said trailing blade group to run from said open position to said closed position so that a light shielding of said aperture area is secured by said trailing blade group at a time of film rewinding.

14. A camera according to claim 13, wherein said second driving means for the trailing blade group of said shutter is made of an electromagnet.

15. A camera according to claim 14, wherein said electromagnetic is caused to run the trailing blade group of the shutter by controlling a current supply to a coil of the electromagnet.

* * * * *